United States Patent Office 3,166,526
Patented Jan. 19, 1965

3,166,526
VINYLIDENE CHLORIDE POLYMER COMPOSITIONS HAVING IMPROVED LOW TEMPERATURE PROPERTIES
George J. Butzler, George B. Sterling, and Robert E. Lee, Midland, Mich., assignors to The Dow Chemical Company, Midland, Mich., a corporation of Delaware
No Drawing. Filed June 13, 1962, Ser. No. 202,064
12 Claims. (Cl. 260—31.8)

This invention relates to polymeric compositions and, in particular, to polymeric compositions based on vinylidene chloride polymers and copolymers.

Polymers and copolymers of vinylidene chloride with such comonomers as acrylonitrile, vinyl chloride, and lower alkyl acrylates have found wide use as films for packaging of foodstuffs and other articles. Such films possess many useful properties, such as inertness, ability to be heat-sealed, transparency, shrinkability, and low water vapor transmission rates, which are desirable for packaging foodstuffs. However, prior vinylidene chloride polymer films suffered the disadvantage of becoming brittle and losing strength and other qualities at low temperatures. Prior art attempts to plasticize these copolymers have not generally been successful in overcoming those problems. The compatibility of liquid plasticizers with vinylidene chloride polymers is restricted which limits low temperature flexibility. Such liquid plasticizers also have a tendency to bleed out of the composition which is undesirable for packaging of certain foods.

Accordingly, it is a principal object of this invention to provide polymeric compositions based on polymers of vinylidene chloride which compositions retain their flexibility and other properties at low temperatures, such as are encountered in refrigerated foodstuffs and frozen foodstuffs.

It is a further object of the invention to provide polymeric compositions which have an advantageously low melt viscosity which facilitates the fabrication of films by extrusion and the like.

It is a further object of this invention to provide polymeric compositions which are relatively impermeable to water vapor and other gases.

The polymeric compositions of this invention comprise a blend of (I) from 70 to 95% by weight of the composition of a normally crystalline polymer consisting of (a) about 70 to 100% by weight of vinylidene chloride and (b) 0 to 30% by weight of at least one monoethylenically unsaturated comonomer and (II) from 5 to 30% by weight of the composition of a rubber-like terpolymer consisting of (1) from 70 to 95% by weight of a conjugated diolefin and (2) 5 to 30% by weight of a monomeric composition consisting of a blend of lower alkyl-lower alkenylketones and lower alkyl alkacrylates.

The normally crystalline vinylidene chloride polymers usable in this invention are well known and may be prepared by interpolymerizing vinylidene chloride with known comonomers. Typical of the normally crystalline polymeric materials falling within the advantageous definition are the polymers and copolymers of at least 70% by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropene. Known ternary compositions also may be employed advantageously. Representative of such polymers are those composed of at least 70% by weight of vinylidene chloride with the remainder made of of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition will also be known.

The rubber-like terpolymers which impart low temperature flexibility to the vinylidene chloride polymer are terpolymers of (1) an open chain aliphatic conjugated diolefin having from 4 to about 9 carbon atoms, such as butadiene or isoprene, (2) lower alkyl-lower alkenyl-ketones, such as methyl isopropenyl ketone, ethyl vinyl ketone, and methyl vinyl ketone and (3) lower alkyl alkacrylates, such as methyl methacrylate, isopropyl methacrylate, butyl methacrylate, methyl ethacrylate, ethyl ethacrylate, and propyl ethacrylate. The contemplated terpolymers are rubber-like elastomers. Such elastomers have a Mooney viscosity at 212° F. of about 1 to 146 preferably in the range of about 30 to 70. The rubber-like terpolymers are known and may be prepared by copolymerizing the monomers in aqueous emulsion, as for example, by the procedure as generally disclosed in U.S. Patent No. 2,462,354.

The polymeric blends of the invention may include plasticizers, such as dioctyl phthalate, dibutyl sebacate, and the like, in the range of about 2 to 10% by weight of the composition. The polymer blend may also include antioxidants, light stabilizers, and other additives known in the art which do not deleteriously affect the properties of the film.

The polymer blends of the invention are preferably prepared by mixing latexes of the vinylidene chloride polymers and of the rubber-like terpolymer in the proper proportions, coagulating the latex blend with alum or other known coagulants and recovery of dried polymer as is known in the art. The polymer blends are preferably extruded in tube form, stretched and oriented by the bubble technique and slit to form films as is known in this art. The compositions are useful in other processes, such as molding, slot extrusion, and other thermal fabrication techniques, to form films, fibers, foils, molded articles, and other forms having the superior properties.

The products of this invention will be illustrated with the following example in which all percentages and parts are by weight.

EXAMPLE I

A latex containing 34% solids of a copolymer composed of 73% by weight vinylidene chloride and 27% by weight of vinyl chloride was prepared by emulsion polymerization, utilizing potassium persulfate as the catalyst and the dihexyl ester of the sodium salt of sulfosuccinic acid as the emulsifier in a manner well known in the art.

Several batches of rubbery latexes were prepared composed of 80% butadiene, 10% methyl isopropenyl ketone, and 10% methyl methacrylate to form latexes having about 45% solids content utilizing potassium persulfate as the catalyst and the dihexyl ester of the sodium salt of sulfosuccinic acid as the emulsifier. To each latex there was added 1% based on latex solids of 2,4-dimethyl-6-(1-methylcyclohexyl) phenol as an antioxidant.

Separate polymer blends composed of (I) 85% by weight of the vinylidene chloride-vinyl chloride copolymer as described herein, and (II) 15% by weight of the terpolymer described herein were formed by individually blending such polymeric latexes in the desired proportions, and subsequently coagulating and drying the same.

Unplasticized flow moldings were made from certain of the blends. In one case 7% of dibutyl sebacate was added as a plasticizer and 0.5% MgO. In another case an unstabilized blend was prepared, that is a blend which did not contain the antioxidant 2,4-di-methyl-6-(1-methylcyclohexyl)phenol. A sample of the unblended vinylidene chloride polymer was used as a comparison. Flow moldings were made of these samples in identical manner to the previously mentioned moldings.

Another sample of the polymer blend was thermally extruded using standard bubble techniques into oriented films having a thickness of 0.001 inch. A similarly prepared sample of unblended vinylidene chloride copolymer containing 5% dibutyl sebacate was employed for comparative purposes.

The following tables summarize the results of the physical properties determined on the moldings and the oriented film. The column headed "Rubber Content" indicates the amount of the rubbery terpolymer in the sample.

*Table I.—Moldings*

| Sample No. | Rubber Content | Melt Viscosity (poises × $10^3$) | Flexural Modulus, ° C. |
|---|---|---|---|
| For Comparison: | | | |
| 1 | Non (control) | 180 | 8 |
| This Invention: | | | |
| 2 | 15% | 318 | −2 |
| 3 | 15%+7% Plasticizer+ 0.5% MgO. | 92 | −28 |
| 4 | 15% (no antioxidant) | 300 | −8 |

In all the tables of this example, the colum headings have the following meanings:

Melt Viscosity (Poise)—Expresses the flowability of a plastic at 180° C. and 237 lbs./in.$^2$ pressure between parallel platens at essentially zero shear rate.

Flexural Modulus (° C.)—The temperature at which the unplasticized molded strip possesses a modulus of $2.5 \times 10^5$ lbs./in.$^2$ in flexure.

Cold Flex—Number of hand flexes at −18° C. to produce rupture.

*Table II.—Oriented films*

| Sample No. | Rubber Content | Cold Flex −18° C. | Cold Flex −40° C. |
|---|---|---|---|
| For Comparison: | | | |
| 5 | None (control +5X plasticizer). | 1 | <1 |
| This Invention: | | | |
| 6 | 15% | 10+ | 2 |

From the data presented, it can be seen that the addition of the indicated amounts of the specified elastomeric polymers to the normally crystalline vinylidene chloride copolymers results in blends having appreciably enhanced physical properties, over the vinylidene chloride copolymers whether plasticized or unplasticized and whether stabilized or unstabilized.

Similar good results are obtained from any composition comprising (I) from 70 to 95% by weight of the composition of a normally crystalline polymer consisting of (a) about 70 to 100% by weight of vinylidene chloride and (b) 0 to 30% by weight of at least one monoethylenically unsaturated comonomer and (II) from 5 to 30% by weight of the composition of a rubber-like terpolymer as described herein.

From all of the above data it can be seen that incorporation of the ternary rubber compositions described herein, into normally crystalline vinylidene chloride polymers produces most favorable films and other articles for low temperature utility while retaining the desirable physical characteristics of those vinylidene chloride polymers.

We claim:

1. A polymeric composition comprising a blend of (I) from 70 to 95% by weight of the composition of normally crystalline polymer selected from the group consisting of polyvinylidene chloride and interpolymers of at least about 70% by weight of vinylidene chloride with up to about 30% by weight of at least one other monoethylenically unsaturated comonomer and (II) complementarily from 5 to 30% by weight of the composition of a rubber-like terpolymer consisting of (1) from 70 to 95% by weight of an open chain aliphatic conjugated diolefin having from 4 to about 9 carbon atoms and (2) 5 to 30% by weight of a monomeric composition consisting of a blend of a lower alkyl-lower alkenyl-ketone and a lower alkyl alkacrylate.

2. The composition as claimed in claim 1 wherein said normally crystalline polymer is a copolymer of vinylidene chloride and vinyl chloride.

3. The composition as claimed in claim 2 wherein said normally crystalline polymer is a copolymer of 73% by weight of vinylidene chloride and 27% by weight of vinyl chloride.

4. The composition as claimed in claim 1 wherein said rubber-like terpolymer is composed of (1) butadiene, (2) methyl isopropenyl ketone, and (3) methyl methacrylate.

5. The composition as claimed in claim 1 containing from 2 to 10% by weight of the composition of a plasticizer for a crystalline vinylidene chloride polymer.

6. The composition as claimed in claim 5 wherein said plasticizer is dibutyl sebacate.

7. The composition as claimed in claim 1 wherein said composition contains an antioxidant.

8. The composition as claimed in claim 7 wherein said antioxidant is 2,4 - dimethyl - 6 - (1 - methylcyclohexyl) phenol.

9. A polymeric composition comprising a blend of (I) 85% by weight of the composition of a normally crystalline polymer consisting of (a) 73% by weight of vinylidene chloride and (b) 27% by weight of vinyl chloride and (II) 15% by weight of the composition of a rubber-like terpolymer consisting of (1) 80% by weight of butadiene and (2) 10% by weight of methyl isopropenyl ketone and (3) 10% by weight of methyl methacrylate.

10. The composition as claimed in claim 9 containing from 2 to 10% by weight of the composition of dibutyl sebacate.

11. An oriented film having improved flexibility at temperatures below 32° F. composed of a homogeneous blend of (I) 85% by weight of the film of a normally crystalline polymer consisting of (a) 73% by weight of vinylidene chloride and (b) 27% by weight vinyl chloride and (II) from 15% by weight of the film of a rubber-like terpolymer consisting of (1) 80% by weight of butadiene, (2) 10% by weight of methyl isopropenyl ketone and (3) 10% by weight of methyl methacrylate.

12. A molded article composed of a homogeneous blend of (I) 85% by weight of the article of a normally crystalline polymer consisting of (a) 73% by weight of vinylidene chloride and (b) 27% by weight of vinyl chloride (II) 15% by weight of the article of a rubber-like terpolymer consisting of (1) 80% by weight of butadiene (2) 10% by weight of methyl isopropenyl ketone and (3) 10% by weight of methyl methacrylate.

References Cited in the file of this patent

UNITED STATES PATENTS

| | | |
|---|---|---|
| 2,469,721 | Gidley | May 10, 1949 |
| 3,005,796 | Dreisbach | Oct. 24, 1961 |
| 3,033,812 | Isaccs et al. | May 8, 1962 |

FOREIGN PATENTS

| | | |
|---|---|---|
| 644,005 | Canada | July 3, 1962 |

OTHER REFERENCES

Buttrey: Plasticizers, Franklin Publishing Co., New Jersey, Chapter 4, p. 76, 1960.

Miall: A New Dictionary of Chemistry. Interscience Publishers Inc., New York, p. 48, 1961.